Patented Dec. 18, 1951

2,578,853

UNITED STATES PATENT OFFICE 2,578,853

ALKOXYCHLOROBENZENES AS PLASTICIZERS FOR ELASTOMERS

James K. Stevenson, Columbus, Ohio, assignor, by mesne assignments, to Niagara Alkali Company, New York, N. Y., a corporation of New York No Drawing. Application April 11, 1950, Serial No. 155,350

7 Claims. (Cl. 260—33.2)

The present invention relates to synthetic rubber or elastomers having incorporated therein an alkoxy chlorobenzene as a plasticizer.

In order to meet the requirements of everyday general commercial use, synthetic rubbers often require the addition thereto of a plasticizer. This is particularly true of the nitrile type synthetic rubbers. In selecting the proper plasticizer for a synthetic rubber, due consideration must be given to the compatibility of the two materials. This means that the plasticizer and synthetic rubber must remain a homogeneous mass over considerable temperature range without any exudation of either component. In addition, the plasticizer chosen must be one which will produce a synthetic rubber having a satisfactory ultimate elongation, a proper stress under elongation and good tensile strength.

I have found that a number of alkoxy chlorobenzenes are generally compatible as plasticizers for elastomers, especially with a nitrile type synthetic rubber, and that I am thereby able to produce a product which has a satisfactory stress at elongation, ultimate elongation, and tensile strength, and which is therefore suitable for commercial use.

Other objects and advantages of my invention will be apparent from the following detailed description.

The alkoxy benzenes which are used as plasticizers have the general formula

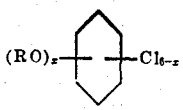

where R is any hydrocarbon radical, preferably an alkyl radical of 2 to 18 carbon atoms, and $x$ is a small whole number of less than six, usually 1 to 3. The alkoxy benzenes may be made by reacting hexachlorobenzene with the appropriate alcohol in the presence of an alkali hydroxide.

The following examples are descriptive of several alkoxychlorobenzenes which may be used in accordance with the invention, and their preparation.

EXAMPLE 1

6 mols of hexachlorobenzene, 12 mols of sodium hydroxide and 27 mols of butanol were placed in a suitable reaction vessel and heated at atmospheric pressure. The preheating period required 0.7 hour to heat the mixture to a temperature of 114°–115° C. at which temperature it was maintained for 1 hour following which the mixture was cooled over a period of 0.6 hour. Based on distillation temperatures and chlorine analysis the product was found to be 92.4% butoxy pentachlorobenzene and 7.6% dibutoxytetrachlorobenzene.

EXAMPLE 2

5 mols of hexachlorobenzene, 30 mols of sodium hydroxide and 67.5 mols of butanol were placed in a reaction vessel and heated to a temperature of 117°–123° C. for 7 hours utilizing a similar preheating and cooling schedule as in Example 1. Based on analysis by distillation and chlorine content, the product was found to contain 82.8% dibutoxy tetrachlorobenzene and 17.2% monobutoxy pentachlorobenzene.

From a comparison of Examples 1 and 2 it will be noted that the extent of the substitution of the chlorine atom by the butoxy radical is a function of the proportions of the reacting components to the reaction time and the temperature of the reaction. Increased amounts of sodium hydroxide and butanol, together with a longer reaction time and higher temperature, favor the formation of the higher substituted compound. By adjusting these variables, a product can be made consisting almost entirely of the mono compound or the poly compound. By extending these variables, it is possible to make a composition having a substantial amount of the tri-compound.

The reaction products can be used as mixtures or can be separated by fractional distillation under reduced pressure and the compounds used separately.

EXAMPLE 3

6 mols of hexachlorobenzene, 12 mols of sodium hydroxide and 19.2 mols of ethylhexyl alcohol were reacted at a temperature of 139°–152° C. for 2 hours following a preheating time of 0.7 hour. Analysis showed the product to contain 90.8% mono(ethylhexoxy) pentachlorobenzene and 9.2% di(ethylhexoxy) tetrachlorobenzene.

By increasing the temperature to 175–191.5° C., the amount of the tri-compound is increased to 66.8% with 33.2% of the di-compound.

In accordance with the present invention, the alkoxy chlorobenzene is conventionally milled into the elastomer.

The nitrile type synthetic rubber is selected as illustrative of the best mode of applying the invention and is made by copolymerizing butadiene and acrylic nitrile following the general formula:

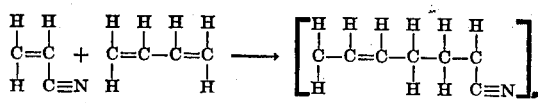

It is a well-known type of synthetic rubber of commerce and is made under such trade names as "Buna N," "Perbunan," "Hycar-Or," and "Chemigum."

The milled sheets, after a suitable cooling period, are then molded at a temperature ranging from approximately 250° to 325° F. and under approximately 500 to 1000 lbs./sq. in. pressure. The milled sheets are again allowed to stand for an additional cooling period. The product produced was found to have commercially desirable elongation and tensile characteristics.

The invention may be further illustrated by the following examples and table of tests. It is to be understood that these examples are intended only as practical illustrations disclosing the practice of the invention, and are not to be construed as limiting the scope thereof as defined in the claims.

EXAMPLE 1A

Twenty parts of n-butoxypentachlorobenzene made in accordance with Example 1 is milled into a hundred parts of synthetic rubber stocks of an oil-resistant butadiene-acrylonitrile copolymer containing a carbon black filler and a conventional curing agent (Hycar Or–15). The milled sheets are then left to cool for about 24 hours. Afterwards, they are molded by standard molding technique and cured at a temperature of 310° F. and under a pressure of 1000 lbs./sq. in. for 30 minutes. The molded sheets are then left to cool for approximately another 24 hour period.

EXAMPLE 2A

Twenty parts of di-n-butoxytetrachlorobenzene made in accordance with Example 2, and one hundred parts of the oil-resistant butadiene-acrylonitrile copolymer described in Example 1 are treated in accordance with the procedure disclosed in Example 1.

EXAMPLE 3A

Twenty parts of 2-ethylhexoxypentachlorobenzene made in accordance with Example 3 and one hundred parts of the same oil-resistant butadiene-acrylonitrile copolymer described in Example 1 were treated in accordance with the disclosure of Example 1.

The physical properties of the above molded sheets were compared with the physical properties of sheets of the same above-described butadiene-acrylonitrile copolymer stocks containing commercial plasticizers as a control, and which were prepared according to the procedure outlined in Examples 1A to 3A. The following table shows the comparative data of the tests carried out in regard to the tensile and elongation strengths of the above products.

PHYSICAL PROPERTIES OF PLASTICIZED BUTADIENE-ACRYLONITRILE STOCKS

| Plasticizer | Tensile Strength | Stress at 100% Elongation | Stress at 300% Elongation | Ultimate Elongation |
|---|---|---|---|---|
| | P.s.i. | P.s.i. | P.s.i. | Per cent |
| n-Butoxypentachlorobenzene | 3,090 | 280 | 1,650 | 520 |
| Di-n-butoxytetrachlorobenzene | 3,155 | 250 | 1,640 | 545 |
| 2-Ethylhexoxypentachlorobenzene | 3,435 | 280 | 1,745 | 575 |
| Paraplex G-25 [1] (Control) | 2,410 | 560 | 2,130 | 370 |
| Flexol TOF [2] (Control) | 2,410 | 160 | 1,685 | 540 |

[1] A synthetic, saturated polyester resin; sp. gr. 1.06; acid no. 3.0.
[2] Trioctyl phosphate.

Butadiene-acrylonitrile stocks, when containing one of the current known plasticizers, generally have properties that fall within the range covered by that stock having the control plasticizer therein. In view of the excellent elongation and tensile qualities that the alkoxy chlorobenzenes impart to a nitrile type synthetic rubber, and the satisfactory stress under elongation, it can be readily seen that these ethers are commercially desirable plasticizers for nitrile type synthetic rubbers. Moreover, these plasticizers in nitrile type synthetic rubber have been found to give satisfactory low temperature properties.

The proportions of the nitrile type rubber and the plasticizer are not critical except in so far as they are incompatible. Any significant amount exerts some plasticizing effect and the lower limit will be determined by the plasticizing effect desired, considering the use to which the product is to be put and the economics involved. Amounts within the range of 1 to 50% would represent the extremes, and the usual range would be about 10 to 25%.

The composition may include any ingredient normally used in such a composition such as fillers, pigments, antioxidants, and even other plasticizers.

The alkoxy chlorobenzenes here described have limited compatibilities with most resins and are totally incompatible with many resins other than elastomers, including representative vinyl resins, nitro cellulose and cellulose acetate. The compatibility and plasticizing properties of these ethers in nitrile rubber are therefore believed to represent a composition of unusual utility.

The invention is not limited to any particular method of manufacturing the ethers, nor to the method of incorporating them in the nitrile rubber, or curing or molding techniques since the latter are well understood in the art.

I claim:

1. A butadiene-acrylic nitrile synthetic rubber having incorporated therein an alkoxy chlorobenzene as a plasticizer.

2. A butadiene-acrylic nitrile synthetic rubber having incorporated therein as a plasticizer an alkoxy chlorobenzene having 1 to 3 alkoxy groups having 2 to 18 carbon atoms.

3. A butadiene-acrylic nitrile synthetic rubber having incorporated therein as a plasticizer an alkoxypentachlorobenzene in which the alkoxy group has from 4 to 8 carbon atoms.

4. A butadiene-acrylic nitrile synthetic rubber having incorporated therein as a plasticizer a dialkoxytetrachlorobenzene in which each di-alkoxy group has from 4 to 8 carbon atoms.

5. A butadiene-acrylic nitrile synthetic rubber containing butoxypentachlorobenzene as a plasticizer.

6. A butadiene-acrylic nitrile synthetic rubber containing di-butoxytetrachlorobenzene as a plasticizer.

7. A butadiene-acrylic nitrile synthetic rubber containing 2-ethylhexoxypentachlorobenzene as a plasticizer.

JAMES K. STEVENSON.

REFERENCES CITED

The following references are of record in the file of this patent:

UNITED STATES PATENTS

| Number | Name | Date |
|---|---|---|
| 2,267,773 | Walker | Dec. 30, 1941 |
| 2,271,124 | Juve et al. | Jan. 27, 1942 |
| 2,329,033 | Britton et al. | Sept. 7, 1943 |